United States Patent [19]

Leiber

[11] Patent Number: 4,489,555
[45] Date of Patent: Dec. 25, 1984

[54] HYDRAULIC DUAL-CIRCUIT BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 538,639

[22] Filed: Oct. 3, 1983

[30] Foreign Application Priority Data

Dec. 2, 1982 [DE] Fed. Rep. of Germany ....... 3244560

[51] Int. Cl.³ .............................................. F15B 7/00
[52] U.S. Cl. ......................................... 60/534; 60/548; 60/551; 91/369 R
[58] Field of Search .............. 60/534, 535, 547.1, 60/548, 551, 553, 545, 582, 591, 577; 91/369 R, 376 R

[56] References Cited

U.S. PATENT DOCUMENTS

| 2,396,536 | 3/1946 | Sauzedde | 60/577 |
| 3,990,241 | 11/1976 | Owens | 60/584 |
| 4,126,996 | 11/1978 | Leiber | 60/547.1 |
| 4,285,199 | 8/1981 | Leiber | 60/545 |
| 4,398,389 | 8/1983 | Horvath | 60/545 |

Primary Examiner—Robert E. Garrett
Assistant Examiner—Scott L. Moritz
Attorney, Agent, or Firm—Edwin E. Greigg

[57] ABSTRACT

A hydraulic dual-circuit brake booster in which two brake circuits are closed brake circuits. A dual-circuit tandem main cylinder is used in combination with a pedal push rod supported in a displaceable piston and exposed to the brake pressure directed into the system by the control valve. The pedal push rod and the tandem main brake cylinder are disposed coaxially and the brake booster is particularly suitable for use with anti-skid brake systems.

20 Claims, 2 Drawing Figures

# HYDRAULIC DUAL-CIRCUIT BRAKE BOOSTER

BACKGROUND OF THE INVENTION

The invention is based on a hydraulic dual-circuit brake booster for a vehicle brake system.

A brake booster of this kind is known (German Offenlegungsschrift No. 25 31 264). In this known brake booster, however, only one brake circuit is closed, while the other is open and is supplied directly by the pressure directed into the system by the control valve. If the pressure supply fails, the open brake circuit becomes a closed brake circuit. The disadvantage then, however, is that if there is a defect in the open brake circuit the pressure supply for the entire system fails.

OBJECT AND SUMMARY OF THE INVENTION

The hydraulic dual-circuit brake booster has the advantage over the prior art that if one brake circuit fails the pressure supply remains intact, and braking can still be performed with full boosting using the other brake circuit.

The coaxial disposition of the pedal push rod and the two main cylinder pistons has the further advantage that frictional forces which could impair the optimal design of the brake booster are avoided. This is particularly important in the event of a pressure supply failure.

Because the pedal push rod is supported in the displaceable piston, which is acted upon by the braking pressure directed into the system, a highly progressive force increase can be attained after the brake booster is at full output, and this increase is perceptible by the increase in pedal stiffness. This sort of pedal characteristic is desirable.

With tandem brake boosters, which operate with open and closed brake circuits, it is problematic to detect damage to the sleeve of the main brake cylinder piston which is acted upon by the pressure of the open brake circuit. If the pressure supply is intact, a leak in the primary sleeve is dectectable only if the leak is very large and the leakage quantity is larger than the quantity supplied by the pump. Detecting this occasions additional expense. As an alternative, a so-called dual-chamber main cylinder piston can also be used, but again additional expense must be undergone, and the length of the apparatus is increased. A failure of this sleeve is important in terms of safety, because if the closed circuit should fail the open circuit must not be allowed to be defective, as would be the case if the sleeve were defective. In a system having two closed brake circuits, a defect of the sleeve of the first piston is be detected by the corresponding movement of the piston disposed behind it, because pressure medium flows out of the closed brake circuit via the defective sleeve. A defect of the primary sleeve of the rear piston is not important to safety, because if the pressure supply fails the full braking effect is assured in both brake circuits via the pedal push rod.

Embodying the main brake cylinder as a stepped main brake cylinder affords advantages in the event of a failure of brake circuit II. In the case, a pressure translation is effected as a result of the difference in piston surface areas, so that despite the failure of the brake circuit, virtually the same relationship is attained between pedal force and vehicle deceleration. With a conventional brake circuit disposition, it is recommended that brake circuit I be assigned to the rear axle, because especially in a loaded vehicle very high brake pressures become necessary for the rear axle. Here again, the pressure translation is advantageous.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
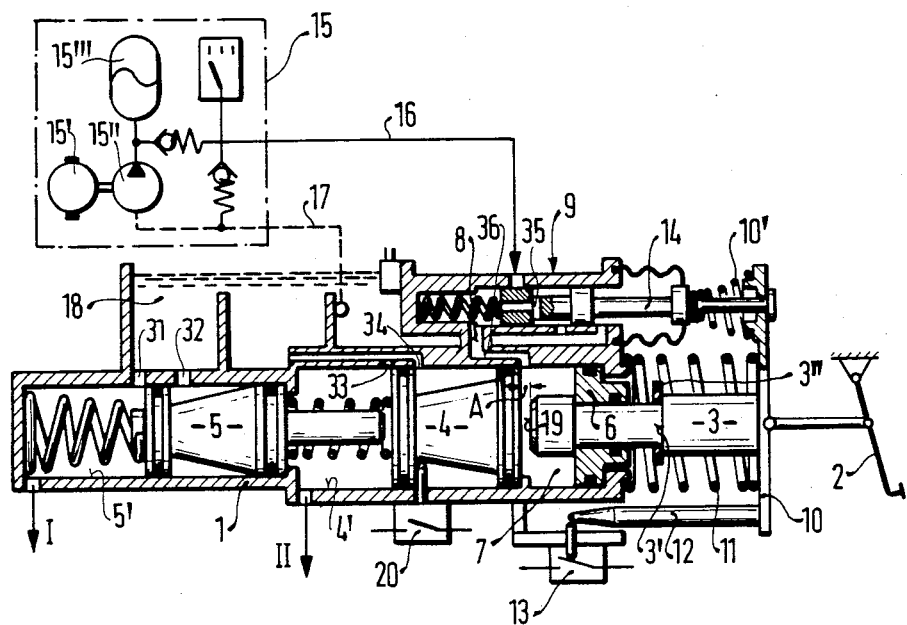
FIG. 1 shows a first exemplary embodiment of a brake booster with a control valve located on the outside.

FIG. 1 shows a brake booster having a dual-circuit tandem main brake cylinder 1, with which a pedal push rod 3 actuatable via a brake pedal 2 is coaxially disposed. The tandem main cylinder 1 is embodied as a stepped main cylinder including bores of different diameters to form cylinders 4' and 5', but it may also have a bore of constant diameter for two axially aligned main cylinder pistons 4 and 5 which are operable within cylinders 4' and 5', respectively. Cylinder 4' connects with an outlet line to brake system II and cylinder 5' connects with brake system I which controls the rear wheels.

The pedal push rod 3 is supported in and movable relative to a displaceable piston 6 disposed in a cylinder on the end of the tandem main brake cylinder 1 toward the pedal, and the inside face of the piston 6 defines a chamber 7, which via a conduit 8 is connected to a control valve 9 of the brake booster. The pedal push rod 3 has a shoulder 3', by way of which the piston 6 can press the pedal push rod 3 backward toward the foot pedal. This shoulder 3' is also padded with a rubber disc 3". The control valve 9 is located outside the axis of the tandem main cylinder 1 and axially parallel thereto.

The pedal push rod 3 has a plate 10, which is supported by means of a spring 11 with respect to the tandem main cylinder 1. An axially aligned pin 12 is secured to the plate 10 on one side, cooperating with a normally open switch 13 which is closed by movement of pin 12 and an intermediate pin as the brake plate 10 is moved by the pedal 2. The switch functions as a position monitoring switch which indicates that the brake has been applied as well known in the art, the switch 13 could operate the brake lights as well as an indicator light in the instrument panel. On the other side of the cylinder 1, the plate 10 has a slide 14 of the control valve 9 which is supported in a yielding manner via a travel-limiting spring 10'. One end of the slide 14 extends through the plate 10 and is movable relative to the plate 10. The spring 10' permits a certain amount of travel of the plate 10 before the valve 9 is actuated. Therefore, the spring 10' adds pressure against the plate 10 which simulates a travel distance of the brake pedal 2 in order to provide a better feel during braking. It is noted that because of the positions of switches 13 and 20 that switch 13 will operate before switch 20.

Connected to the control valve 9 via a pressure line 16 is a brake fluid pressure source 15. The pressure source includes at least one motor 15', one pump 15" and one reservoir 15'''. Also shown is the fluid pressure line 16 and an intake line 17 which leads to the pressure source 15 from a refill chamber 18, which is embodied as a three-chamber container having corresponding connecting conduits to the tandem main cylinder 1.

It should also be noted that in the outset position of the pedal push rod 3 which is shown, an inner end 19 thereof is at a short distance "A" from the first piston 4 of the hydraulic tandem main cylinder 1. At least one further position monitoring switch 20 is also provided on the tandem main cylinder 1 and operated through movement of piston 4.

As shown in FIG. 1, brake fluid contained in refill chamber 18 connects with the cylinder 5' via passages 31 and 32. As shown, the piston 5 includes an end portion having the same diameter as the cylinder 5' which is positioned between passages 31 and 32 when the brake is not in use. The chamber 18 also connects with cylinder 4' via passage 33 and 34 which are on opposite sides of an enlarged end of piston 4 when in the non-braking position.

Mode of Operation

If the pedal 2 is actuated, then the plate 10 is displaced actuating the pedal push rod 3, and the slide 14 of the control valve 9 is displaced via the travel-limiting spring 10'. After the return flow is blocked off, communication is established between the pressure line 16 and the chamber 7 via a passage 35 in slide 14 and a passage 36 in cylinder 1. The pressure directed into the system is on the one hand fed back to the pedal push rod 3, and on the other hand it displaces the two main cylinder pistons 4 and 5 toward the left, in the braking direction so that the piston ends move beyond passage 31 and 33 thereby building up pressure in the two closed brake circuits I and II. After the opening of the inflow, the distance "A" is overcome in the chamber 7, and the end 19 of the pedal push rod 3 comes to rest on the main cylinder piston 4. This has the advantage that in the event of a failure of the pressure supply, the longest possible pedal travel distance is available for generating pressure.

Once the brake booster is at full output, the piston 6 rests on the pedal push rod shoulder 3', so that the pedal 2 becomes very stiff. This is desirable in order to give the driver some sense of the full brake force that is being applied (highly progressive force increase). The use of the rubber disc 3" optimizes the transition to the "stiff" pedal. If there is a fluid supply failure, then the pressure from pedal 2 is transmitted directly to pistons 4 and 5 via the end 19 of pedal push rod 3.

Figure 2:
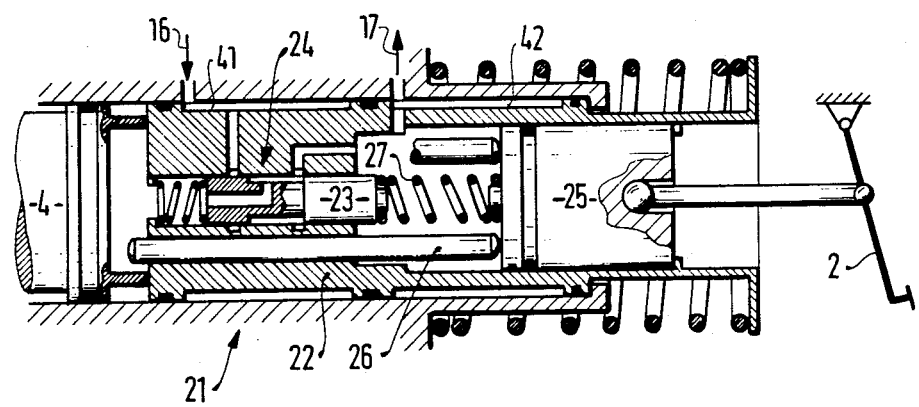
FIG. 2 shows a brake booster type having an integrated control valve.

As shown in FIG. 2, it is also possible to dispose the control valve concentrically in a main brake cylinder 21. Here, a sheath-like piston 22 is used, in which a slide 23 of a control valve 24 is supported. A pedal push rod 25 is supported in the piston 22 and is extended via pins 26 on through the piston 22 and as far as the first main cylinder piston 4. A travel-limiting spring 27 is located between the pedal push rod 25 and the slide 23 of the control valve 24. The pins 26 transmit the force which is proportional to the control pressure onto the pedal push rod 25 in the form of a reactionary force. The piston 22 is provided with annular cut-outs 41 and 42 which permits fluid flow from the pressure line 16 to the main brake 21 and back to the pump via line 17.

Upon the actuation of the pedal 2, the pressure of the pressure source is directed to the control valve 24 via the piston 22. The pedal force is transmitted via the pedal push rod 25 to the travel-limiting spring 27, which switches over the control valve 24. The pressure directed into the system is then effective on the one hand in the braking direction, between the inner end of the piston 22 and the main cylinder piston 4. On the other hand, however, the pressure directed into the tandem main cylinder 21 which is proportional to the pedal force is also fed back via the piston 22 and the pedal push rod 25 to the pedal 2, so that the driver is given a sense of the brake force applied.

If the pressure supply fails, then the pedal push rod 25 and the pins 26 transmit the pedal force directly to the main cylinder pistons 4 and 5. The resultant function then is that of a normal tandem main cylinder.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake booster for vehicle brake systems, which includes a hydraulic main cylinder actuated via a pedal-moved push rod in which said hydraulic main cylinder is disposed coaxially relative to said push rod, a control valve switched by the pedal for directing pressure of a pressure source into the main cylinder, said control valve including a travel limiting means, said hydraulic main cylinder being a dual-circuit tandem main cylinder operable to control two closed brake circuits, said pedal push rod being supported in and movable relative to a displaceable piston including an inner effective surface which is subjected to pressure directed into the system by the control valve and said pedal push rod and the tandem main cylinder are coaxially disposed with said pedal push rod extending from one end of said tandem main cylinder.

2. A brake booster as defined by claim 1, in which the control valve is located outside and parallel with the axis of the pedal push rod and tandem main cylinder.

3. A brake booster as defined by claim 1, in which the control valve is located coaxially with the pedal push rod and the tandem main cylinder.

4. A brake booster as defined by claim 1, which comprises at least one position monitoring switch operable by acutation of said foot pedal.

5. A brake booster as defined by claim 2, which comprises at least one position monitoring switch operable by actuation of said foot pedal.

6. A brake booster as defined by claim 3, which comprises at least one position monitoring switch operable by actuation of said foot pedal.

7. A brake booster as defined by claim 1, which comprises a refill container on the tandem main cylinder in which said refill container is embodied as a three-chamber container.

8. A brake booster as defined by claim 2, which comprises a refill container on the tandem main cylinder in which said refill container is embodied as a three-chamber container.

9. A brake booster as defined by claim 3, which comprises a refill container on the tandem main cylinder in which said refill container is embodied as a three-chamber container.

10. A brake booster as defined by claim 4, which comprises a refill container on the tandem main cylinder in which said refill container is embodied as a three-chamber container.

11. A brake booster as defined by claim 5, which comprises a refill container on the tandem main cylinder in which said refill container is embodied as a three-chamber container.

12. A brake booster as defined by claim 6, which comprises a refill container on the tandem main cylinder in which said refill container is embodied as a three-chamber container.

13. A brake booster as defined by claim 1, which comprises a first position monitoring switch operable by a pin extending from a plate and a second position monitoring switch operable by a piston.

14. A brake booster as defined by claim 2, which comprises a first position monitoring switch operable by a pin extending from a plate and a second position monitoring switch operable by a piston.

15. A brake booster as defined by claim 3, which comprises a first position monitoring switch operable by a pin extending from a plate and a second position monitoring switch operable by a piston.

16. A brake booster as defined by claim 1, in which the pedal push rod includes a shoulder which serves as a rest for an axially aligned displaceable piston and said shoulder is equipped with a rubber disc.

17. A brake booster as defined by claim 4, in which the pedal push rod includes a shoulder which serves as a rest for an axially aligned displaceable piston and said shoulder is equipped with a rubber disc.

18. A brake booster as defined by claim 7, in which the pedal push rod includes a shoulder which serves as a rest for an axially aligned displaceable piston and said shoulder is equipped with a rubber disc.

19. A brake booster as defined by claim 13, in which the pedal push rod includes a shoulder which serves as a rest for an axially aligned displaceable piston and said shoulder is equipped with a rubber disc.

20. A brake booster as defined by claim 1, in which the dual-circuit tandem main cylinder is embodied as a stepped main cylinder.

* * * * *